United States Patent [19]

Blackwood et al.

[11] Patent Number: 4,873,303
[45] Date of Patent: Oct. 10, 1989

[54] METHOD FOR MAKING A REINFORCED PRODUCT OF BITUMINOUS MATERIAL

[75] Inventors: Albert J. Blackwood, Perrysburg; Thomas R. Brady, Granville, both of Ohio

[73] Assignee: Owens-Corning Fiberglas Corporation, Toledo, Ohio

[21] Appl. No.: 870,054

[22] Filed: Jun. 3, 1986

[51] Int. Cl.$^4$ .......................... B05D 3/12; B05D 1/18
[52] U.S. Cl. .................. 427/365; 427/434.4; 427/443
[58] Field of Search .............. 427/434.4, 359, 365, 427/443

[56] References Cited

U.S. PATENT DOCUMENTS

| | | | |
|---|---|---|---|
| 1,184,070 | 5/1916 | Cady | 427/434.4 |
| 1,345,747 | 7/1920 | Cady | 118/419 |
| 1,953,799 | 4/1934 | Eaton | 427/434.4 |
| 2,040,529 | 5/1936 | Pearl | 118/419 |

*Primary Examiner*—Janice Bell
*Attorney, Agent, or Firm*—Ted C. Gillespie

[57] ABSTRACT

A method and apparatus for making a reinforced product of bituminous material comprises drawing a reinforcing mat through a tank of molten bituminous material to impregnate the mat, pulling the impregnated mat through metering rolls to establish the final thickness of the reinforced product, and controlling the relative position of the mat within the reinforced product by controlling the angle of incidence of the impregnated mat with respect to the metering rolls.

5 Claims, 2 Drawing Sheets

METHOD FOR MAKING A REINFORCED PRODUCT OF BITUMINOUS MATERIAL

TECHNICAL FIELD

This invention pertains to making a reinforced product of bituminous material, such as an asphaltic roofing membrane suitable for the use on commercial and industrial roofs. In one of its more specific aspects, this invention relates to drawing a reinforcing mat through a tank of molten bituminous material to impregnate the mat to produce a membrane suitable for use as a roofing material.

BACKGROUND OF THE INVENTION

A common method of production of fiber-reinforced roofing products of bituminous materials is to pull a reinforcing mat through a dip tank or bath of molten bituminous material. The mat can be an organic felt, a glass fiber mat or a synthetic mat such as a polyester mat, or any combination of these. The mat can be pulled through a path defined by a series of rolls and can include turning around one or more rolls which are positioned within the tank of molten bituminous material. The product typically produced by this type of process is a roofing membrane although other products, such as driveway underlayment, can also be produced.

An important consideration in producing fiber reinforced mats of bituminous material is the efficiency of the impregnating process. The process must be run slow enough so that the mat becomes completely impregnated or saturated. Incomplete saturation results eventually in a failure in the product application, such as a roofing failure. The economics of the process requires that the process be run as fast as possible to reduce costs. There is a need for improvements which can increase the level of efficiency of impregnation, while enabling an increase in throughput to reduce operating costs.

Another important consideration in producing fiber reinforced mats of bituminous materials is the positioning of the mat within the bituminus material in the final product. For example, the mat could be positioned near the top of the product, in the middle of the product, or at the bottom of the product. Some products, such as a roofing membrane for use in a two-layer roofing system in which the first layer is torched, require the reinforcement to be positioned in the middle of the product. If the roofing membrane is to be topped with granules, then the mat should be near the top of the product, but not at the very top. Other products, such as a roofing membrane used in a single-ply application, require the reinforcing mat to be positioned at the top of the product in order to provide the best resistance to ultraviolet light. Therefore, it would be useful to have a process for making reinforced products which would enable the positioning of the reinforcing mat at any desired height within the product.

STATEMENT OF THE INVENTION

The present invention solves the problem of positioning the reinforcing mat in a reinforced bituminous product by impregnating a mat in molten bituminous material and drawing it through metering rolls to establish the final thickness of the reinforced product where the angle of incidence and the tension of the mat are controlled to establish the relative position of the mat within the final reinforced product.

According to this invention, there is provided apparatus for making a reinforced product of bituminous material comprising drawing a reinforcing mat through a tank of molten bituminous material to impregnate the mat with the bituminous material, pulling the impregnated mat through metering rolls to establish the final thickness of the reinforced product, establishing the angle of incidence of the impregnated mat with respect to the metering rolls by means of a guide member, and controlling the relative position of the mat within the reinforced product by controlling the angle of incidence. The greater the angle of incidence, the greater the tension on the mat and the lower in the product the mat will be positioned.

In a specific embodiment of the invention, the angle of incidence is controlled by moving the guide member.

In another embodiment of the invention, the angle of incidence is controlled within the range of from about 30 degrees to about 75 degrees.

In yet another embodiment of the invention, the tension of the impregnated mat is controlled as it goes through the metering rolls.

DESCRIPTION OF THE INVENTION

Figure 1:
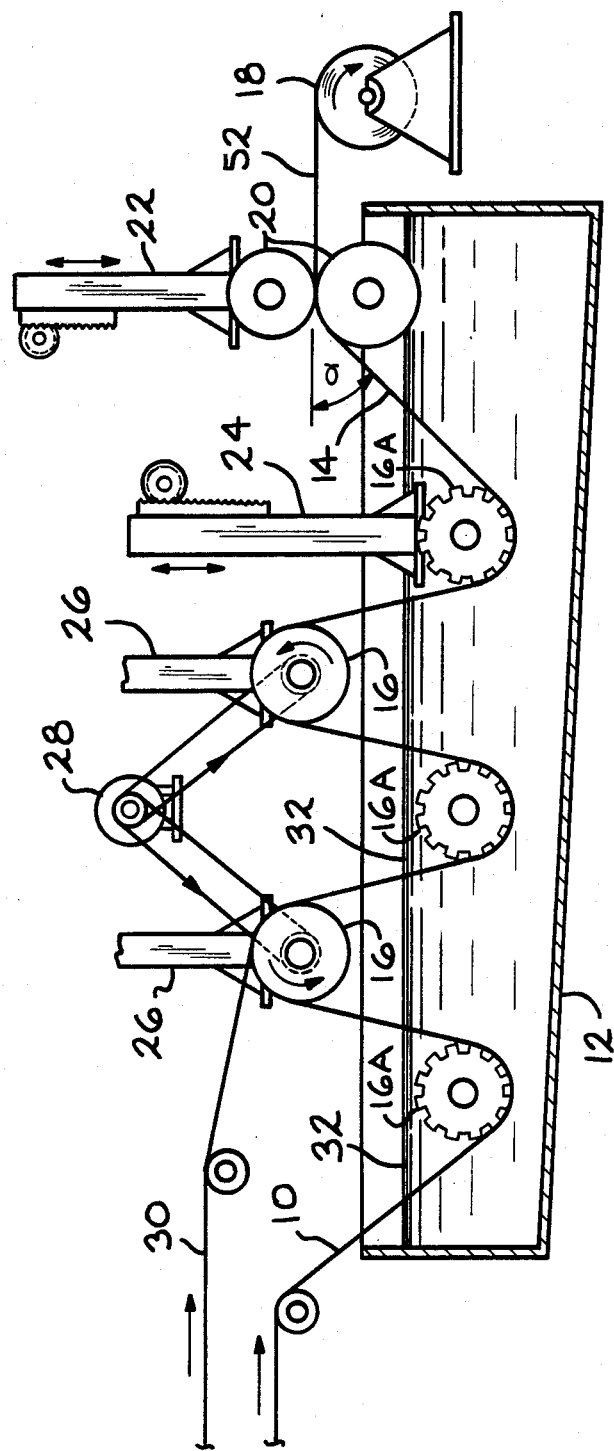
FIG. 1 is a schematic cross-sectional view in elevation of apparatus for making a reinforced product according to the principles of this invention.

As shown in FIG. 1 glass mat 10 is drawn through asphalt tank 12 to form impregnated mat 14. The asphalt tank can contain any molten bituminous material, which can be an asphalt, a pitch or other bituminous substance. The bituminous material can be mixed with extenders, such as limestone, or modifiers such as waxes, rubbers or other chemicals. Typically the bituminous material is maintained at a temperature of about 300° to about 400° F. The typical viscosity of material for a roofing membrane is about 12,000 cps, although viscosities may be as low as 8,000 cps at a typical application temperature of about 375° F. This is in contrast with the typical filled shingle asphalt viscosity which is on the order of about 4,000 to about 5,000 cps. The tank and apparatus within the tank can be maintained at proper temperatures by passing heated oil or other heating fluid through appropriate elements. Any number of suitable rolls, such as rolls 16 can be positioned above and within the tank to define a path for the mat therethrough. The impregnated mat can be pulled through the asphalt tank by any suitable means, such as windup roll 18. The typical throughput or line speed for a process according to this invention is within the range of from about 50 to about 100 feet per minute, although slower or faster speeds are also possible.

Upon leaving the asphalt tank the impregnated mat is passed between a pair of metering rolls 20 which squeeze the impregnated mat to set the final thickness of reinforced product 52. A typical thickness for this product is 3-4 mm. Preferably, the metering rolls are adapted with some means, such as frame 22, for changing the spacing between rolls. Some of the other rolls in the system can be adapted with means suitable for movement vertically, such as frames 26 and suitable motors such as motor 28.

Any number of mats can be applied or passed through the impregnation process. As shown, polymat 30 can be added to the glass mat to make a dual mat product. The glass mat should be suitable for reinforcing asphaltic or bituminous products. Preferably, the glass mat is a 2.8 lb per hundred sq ft wet process mat. The polymat can be any suitable synthetic mat, and can be reinforced with glass fibers.

One or more of the rolls 16, such as dip roll 16A, which is positioned beneath surface 32 of the bituminous material in the tank, preferably has on its surface a plurality of lands, not shown, separated by grooves also not shown. The lands can be of any shape suitable for contacting the mat as the mat travels around the roll. Preferably, the ends or surface of the lands are arcuate so that the surface presented by the lands is a smooth curve. This will minimize instances of tearing or other damage to the mat by the roll. This is particularly important for roofing materials having such high viscosities as being within the range of from about 8,000 cps to about 12,000 cps. The grooves provide a surface for the mat to wrap around as the mat passes around the roll. As the mat comes into contact with the surface, the tension of the mat presses the mat against the lands, thereby squeezing out the air in the mat, similar to the way air is squeezed out of a sponge. As the mat then passes over a groove, the pressure on the mat is released, allowing the mat to soak up the bituminous material.

The dip roll can be mounted for free rotation, in which case it might rotate at a speed slightly slower than the mat throughput speed. The dip roll can also be connected to any suitable means, not shown, to drive the dip roll at a desired speed. Preferably, the surface speed of the roll is different from the throughput speed of the mat so that each segment of the mat passes over numerous lands and grooves as it travels around the roll.

The final dip roll within the asphalt tank before the mat leaves the tank establishes the angle of incidence alpha of the impregnated mat as it approaches the metering rolls. The final dip roll acts as a guide member, although any suitable guide member, such as a rod or bar, can be used to establish the angle of incidence of the impregnated mat with respect to the metering rolls. The final dip roll can be mounted for vertical movement on frame 24 having a worm gear or any other suitable means for vertical movement of the final dip roll. Vertical movement of the final dip roll changes the angle of incidence of the mat, thereby affecting the relative positioning of the mat within the reinforced product.

Figure 2:
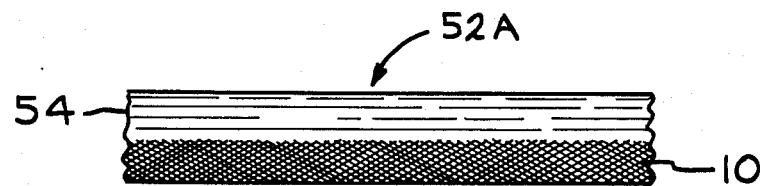
FIG. 2 is a schematic cross-sectional view in elevation of a reinforced product of the invention with the reinforcing mat positioned at the bottom of the product.
Figure 3:
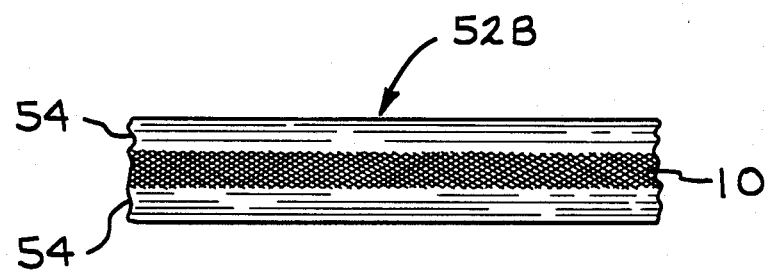
FIG. 3 is a schematic cross-sectional view in elevation of a reinforced product of the invention with the reinforcing mat positioned in the middle of the product.

As shown in FIG. 2, when the angle of incidence is high, the reinforcing mat is pulled rather tightly toward the bottom of the mass of bituminous material 54 in the reinforced product 52A. As shown in FIG. 3, when the angle of incidence is smaller, the mat stays in the center of bituminous material 54 of reinforced product 52B. The process of the invention is especially suited for making reinforced products with the mat at the middle or bottom of the product. In applications where a product with the mat at the top is desired, the product is merely turned upside down.

The tension of the mat also can affect the relative positioning of the mat within the reinforced product. The tension of the mat can be controlled by various methods, such as the relative speed of the windup roll, or the relative vertical positioning of frame 24 and the final dip roll. Other factors affecting tension include the rotation rate of the final dip roll, if it is driven, the speed and relative spacing of the metering rolls, if they are driven, and the speed of rotation or positioning of other rolls on frames 26. The greater the tension, the lower the mat will be in the product.

It will be evident from the foregoing that various modifications can be made to this invention. Such, however, are considered as being within the scope of the invention.

INDUSTRIAL APPLICABILITY

This invention will be found to be useful in the continuous coating of reinforcing mats to produce strip material for such uses as roofing membranes.

We claim:

1. The method of making a reinforced product of bituminous material comprising drawing a reinforcing mat through a tank of molten bituminous material to impregnate the mat with the bituminous material, pulling the impregnated mat through metering rolls to establish the final thickness of the reinforced product, establishing the angle of incidence of the impregnated mat with respect to the metering rolls by means of a guide member, and controlling the relative position of the mat within the reinforced product by controlling said angle of incidence.

2. The method of claim 1 comprising controlling said angle of incidence by moving said guide member.

3. The method of claim 2 comprising controlling said angle of incidence within the range of from about 30 degrees to about 75 degrees.

4. The method of claim 1 comprising controlling the tension of the impregnated mat as it goes through the metering rolls.

5. The method of making a reinforced product of bituminous material comprising drawing a reinforcing mat through a tank of molten bituminous material to impregnate the mat with the bituminous material, pulling the impregnated mat through metering rolls to establish the final thickness of the reinforced product, and controlling the relative position of the mat within the reinforced product by controlling the tension of the impregnated mat as it goes through the metering rolls.

* * * * *